United States Patent
Castellon

(10) Patent No.: US 6,672,967 B2
(45) Date of Patent: Jan. 6, 2004

(54) AXIAL DISPLACEMENT UNIVERSAL JOINT

(76) Inventor: Melchor Daumal Castellon, Diputacion, 455-457, 08013 Barcelona (ES)

( * ) Notice: Subject to any disclaimer, the term of this patent is extended or adjusted under 35 U.S.C. 154(b) by 0 days.

(21) Appl. No.: 10/030,664

(22) PCT Filed: Jun. 19, 2001

(86) PCT No.: PCT/ES01/00246

§ 371 (c)(1),
(2), (4) Date: Nov. 9, 2001

(87) PCT Pub. No.: WO02/12744

PCT Pub. Date: Feb. 14, 2002

(65) Prior Publication Data

US 2002/0137570 A1 Sep. 26, 2002

(30) Foreign Application Priority Data

Aug. 2, 2000 (ES) .......................... 200001964

(51) Int. Cl.[7] ................................ F16D 3/06
(52) U.S. Cl. ................ 464/169; 464/117; 464/162
(58) Field of Search .................... 464/50, 114, 117, 464/137, 162, 169; 74/492, 544; 280/777; 180/384; 173/165

(56) References Cited

U.S. PATENT DOCUMENTS

| | | | |
|---|---|---|---|
| 3,171,269 A | * | 3/1965 | Gilmore et al. ............. 464/169 |
| 5,035,677 A | | 7/1991 | Kanamaru et al. |
| 5,240,218 A | * | 8/1993 | Dye |
| 5,964,664 A | * | 10/1999 | Cook et al. ................. 464/117 |

FOREIGN PATENT DOCUMENTS

| | | |
|---|---|---|
| ES | 380052 | 4/1973 |
| FR | 2783484 | 3/2000 |

* cited by examiner

Primary Examiner—Greg Binda
(74) Attorney, Agent, or Firm—Ostrolenk, Faber, Gerb & Soffen, LLP

(57) ABSTRACT

A connection between two shafts, the shafts can be faced in different directions. Each shaft having a first fork at one end for hingedly joining the respective shaft to a second fork. The second forks are mechanically joined to each other by an axial displacement device comprising a first bearing plate formed integrally to one of the second forks; an intermediate plate, having a plurality of through bores and a central column extending therefrom having a distal end for receiving a remaining second fork; and a second bearing plate, having a central bore for receiving the central column therethrough. A plurality of guiding and support columns extend from the first bearing plate, pass through to the through bores of the through bores of the intermediate plate to the second bearing plate connecting the first and second plates together. The intermediate plate can slide along the guiding and fastening shafts. The clearance between the first bearing plate and the intermediate plate defines the possible axial displacement between the connected shafts.

10 Claims, 3 Drawing Sheets

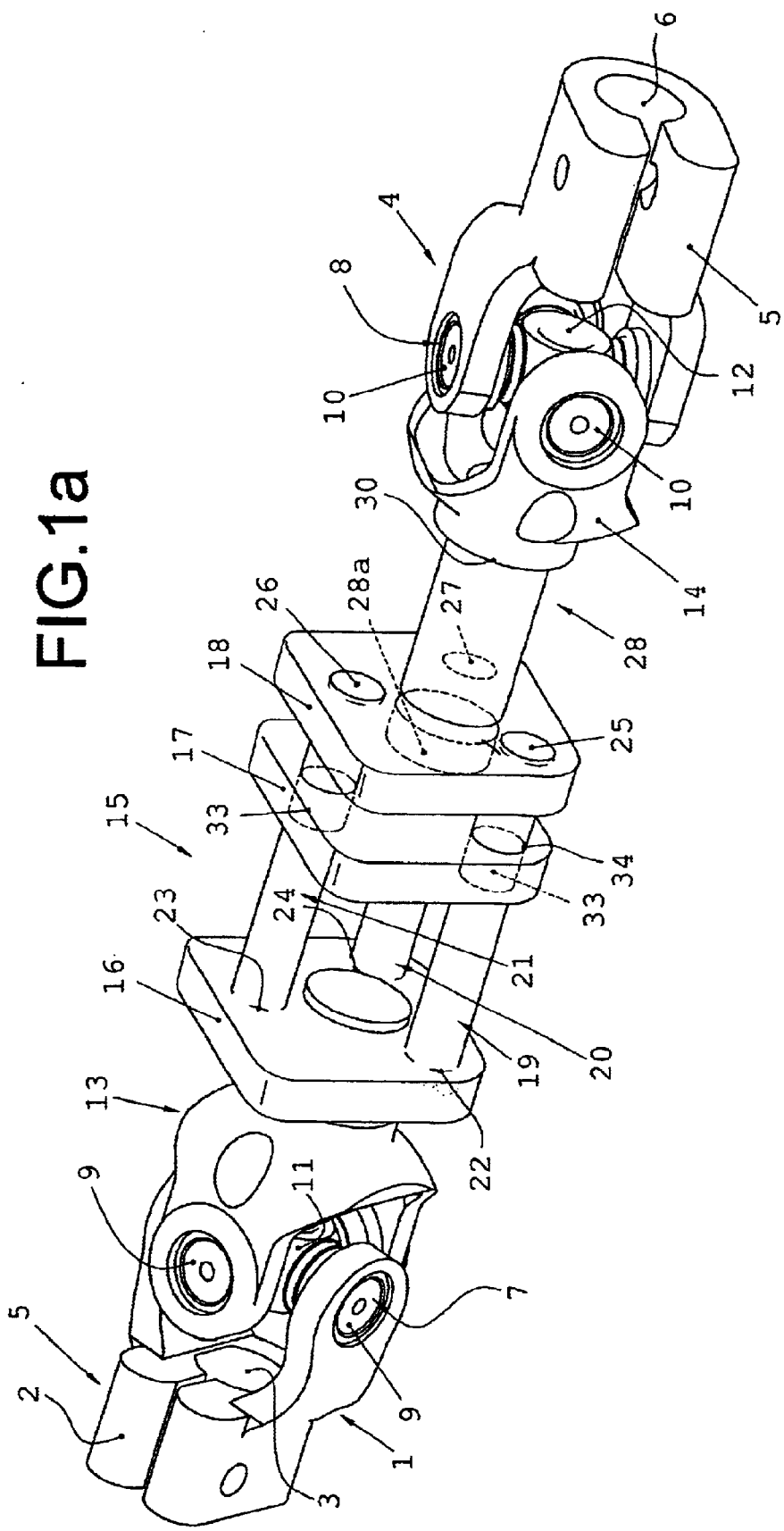

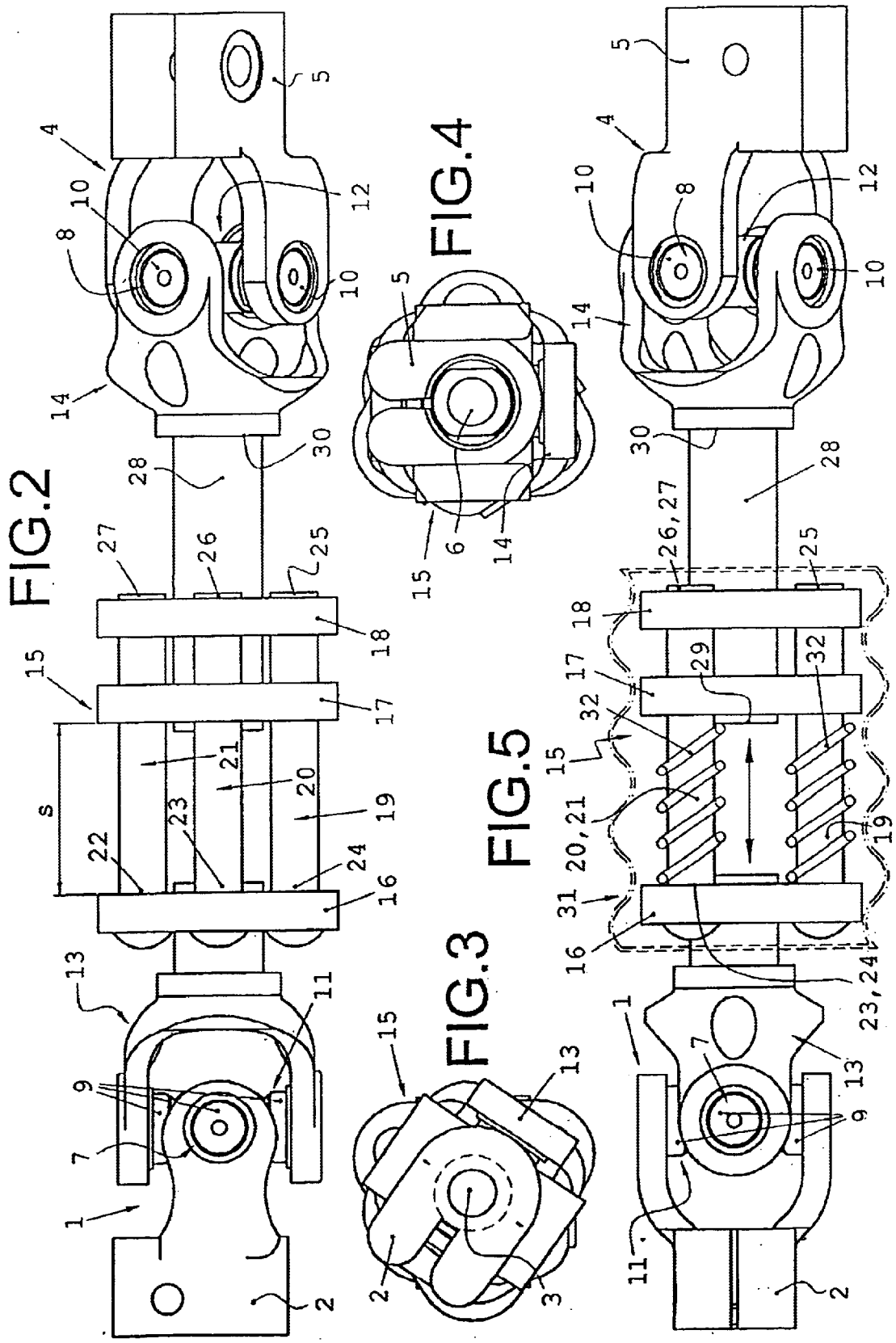

AXIAL DISPLACEMENT UNIVERSAL JOINT

BACKGROUND OF THE INVENTION

Drive devices socalled universal joints are known intended to drive a rotating movement of two shafts arranged at different relative positions to enable the angular displacement therebetween.

Said devices are typically used in the automotive field to drive rotating movement to the wheels when they are driving and driving wheels at a time, as to steering columns of the motor vehicles where it is not possible to drive the movement by means of a monolithic longitudinal shaft, especially due to the particular geometry of the interior of the vehicle where the various mechanical parts in the steering assembly have to be fitted and to work.

SUMMARY OF THE INVENTION

The Axial Displacement Universal Joint provided within the present invention is intended to drive rotating movement between two shafts capable of facing in different directions. To achieve this, one end of said shafts is provided with a first fork having holes intended to receive the ends of the arms of a crosspiece. Said crosspiece hingedly joins said first fork with the ends of a second fork.

The main feature of the present invention is that the second forks of the shafts are mechanically joined to each other by means of an axial displacement device. Said axial displacement device is designed to take up the effects of an external shock which could give rise to interferences on the operation of the mechanical system and even to failures or damages of severe consequences.

In a specific application for steering columns, the use of the universal joint as the one herein described makes possible to advantageously prevent movements from being transmitted from the rack to the steering column of the vehicle thus isolating the columns from the steering assembly.

Another advantage of the present invention is the possibility to change the clearance of the shaft forks which notably facilitates assembly thereof thanks to the play existing therebetween, this allowing the mechanical assembly to be adapted in a more convenient way, always assuring a perfect driving.

More specifically, the axial displacement device of the universal joint of the present invention comprises a first bearing plate that is formed integrally to the second fork of one of the shafts. The axial displacement device also comprises an intermediate plate that is parallel to said first bearing plate. Finally, there is provided a second bearing plate that is parallel thereto.

The first bearing plate of the axial displacement device is provided with guiding and fastening columns. Said columns are formed integrally by one of their ends to the first bearing plate. In turn, these columns are also formed integrally to said second bearing plate by their opposed ends.

The mentioned intermediate plate is provided with through bores adapted to receive said guiding and fastening columns thereacross. Said intermediate plate also has a column formed integrally thereto by an end and, by the other end, to the second fork of the other shaft.

With the disclosed configuration, the relative clearance between said first bearing plate and said intermediate plate defines a displacement between the forks of the respective shafts which provides the above mentioned advantages. Thus, in case of a contingent external stress, the system reacts balancing it by displacing the assembly formed by the columns fixed to the intermediate plate relative to the guiding and fastening columns fixed to the two bearing plates. Hence, there is a relative movement between the forks of the shafts that enables to take up any movement caused by an external agent to the driving system itself, with low sliding load and high twisting stiffness.

The invention also envisages the possibility of providing a flexible protective element that covers the axial displacement device surrounding it so that the mechanical parts are isolated from dust, dirt and other external agents that could affect the dynamic performance of the universal joint. By way of an example, said protective element may be a rubber tube surrounding the device and that, in turn, allows the movement of the elements in an appropriate way.

Additionally, the axial displacement device of the universal joint of the present invention is provided with biasing means tending to keep the clearance between the forks of the respective shafts in the case of an external stress thus allowing taking up of load in the collapse.

Preferably, the first bearing plate of the axial displacement device comprises three cylindrical guiding and fastening columns formed integrally thereto by one of their ends. Their opposed ends are screw fixed to said second bearing plate. The guiding and fastening columns may be hollow bars to reduce the weight of the assembly.

The intermediate plate is provided with friction bushes housed into said through bores to allow the controlled passing of the guiding and fastening columns thereacross and to enhance sliding thereof. Alternatively, the through bores of the intermediate plate have a surface finishing suitable to allow snugly passing of said columns. Thanks to said features, torque transmission with no play and with a very low sliding stress are achieved.

On the other hand, the column formed integrally to the intermediate plate is formed with a cylindrical member fixed thereto passing through a bore of said second bearing plate.

The first bearing plate, the intermediate plate or the second bearing plate may have a quadrilateral or triangular profile with rounded vertexes, even though there is also the possibility of including any appropriate profile.

With a joint as the one herein described it is possible to obtain an effective drive means having a great simplicity and low cost due to the preferred geometries of the plates, as stated above.

Further details and features of the present invention will be apparent from the following description, which refers to the accompanying drawings that schematically represent the preferred details. These details are given by way of example, which refer to a possible case of practical embodiment, but it is not limited to the disclosed details; therefore this description must be considered from a illustrating point of view and without any type of limitations.

BRIEF DESCRIPTION OF THE DRAWINGS

FIG. 1a is a perspective view of a universal joint having quadrilateral bearing plates.

FIG. 2 is an elevational view of the universal joint of FIG. 1;

FIGS. 3 and 4 are end views of the forks corresponding to the driving shafts according to the view of the assembly shown in FIG. 2; and FIG. 5 is a plan view of the universal joint of FIG. 1.

Figure 1:
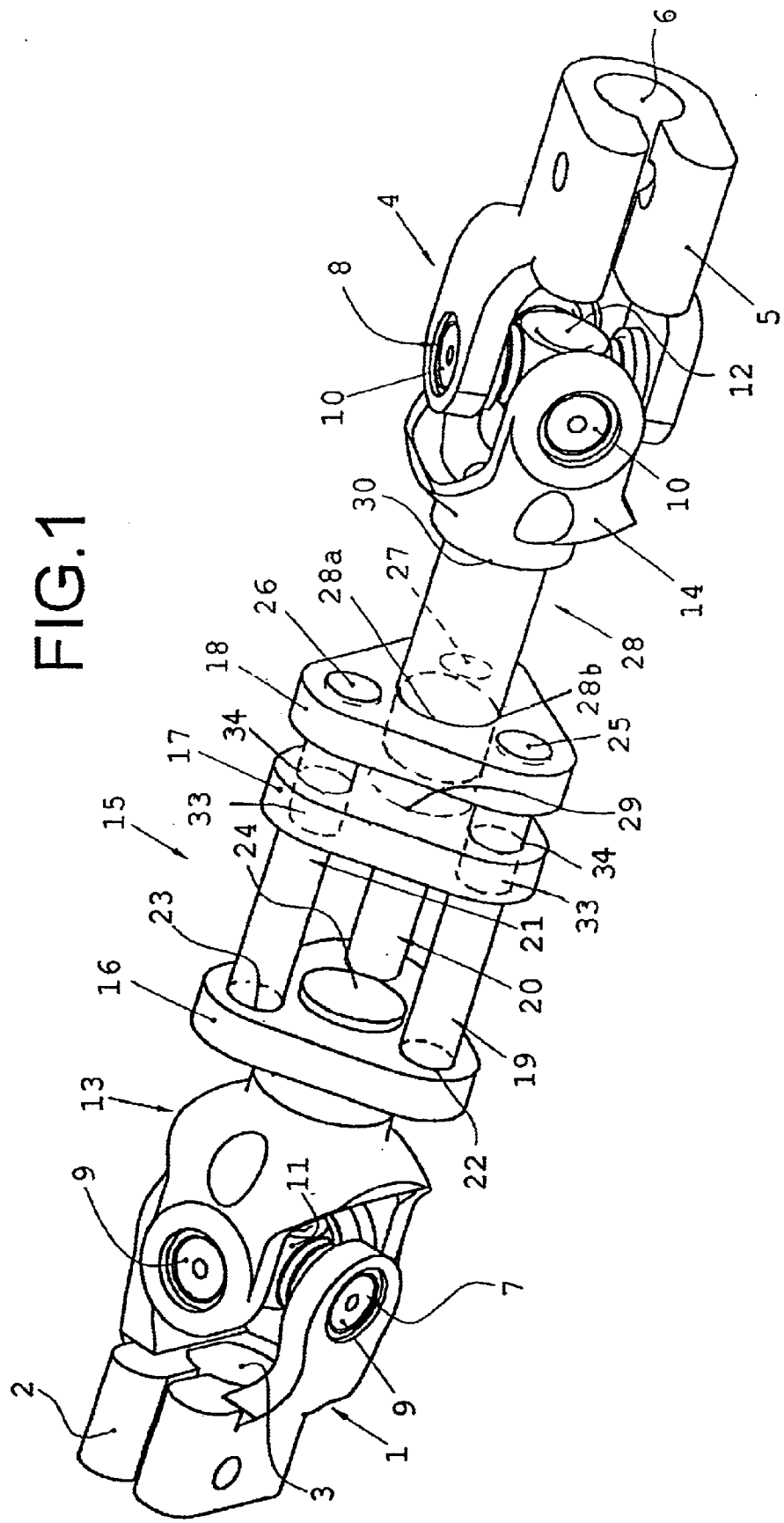
FIG. 1 is a perspective view of the universal joint according to the present invention.

A detailed list of the various parts cited in the present patent application is given below:

(1) first fork corresponding to driving shaft;
(2) extension of the first fork corresponding to driving shaft;
(3) housing of the first fork corresponding to driving shaft;
(4) first fork corresponding to driven shaft
(5) extension of the first fork corresponding to driven shaft;
(6) housing of the first fork corresponding to driven shaft;
(7) bores of the forks of the driving shaft;
(8) bores of the forks of the driven shaft;
(9) ends of the arms of the crosspiece of the driving shaft forks;
(10) ends of the arms of the crosspiece of the driven shaft forks;
(11) crosspiece of the driving shaft forks;
(12) crosspiece of the driven shaft forks;
(13) second fork corresponding to the driving shaft;
(14) second fork corresponding to the driven shaft;
(15) axial displacement device;
(16) first bearing plate;
(17) intermediate plate;
(18) second bearing plate;
(19, 20, 21) guiding and fastening columns;
(22, 23, 24) ends of the guiding and fastening columns;
(25, 26, 27) opposed ends of the guiding and fastening columns;
(28) central cylindrical column;
(28a) central bush of the second bearing plate to enable passing of the central cylindrical column;
(29) end of the central cylindrical column;
(30) opposed end of the central cylindrical column;
(31) protective element of the axial displacement device;
(32) biasing means;
(33) bushes of the intermediate plate to enable passing of the guiding and fastening columns;
(s) clearance between the first bearing plate and the intermediate plate.

DETAILED DESCRIPTION

The assembly shown in the figures comprises a first fork (1) adapted to receive a first shaft, or driving shaft, which it has not been shown in the drawings for the sake of clarity. The end of the driving shaft is housed into an extension (2) of said first fork (1) where there is provided a housing (3) suitably adapted therefor.

At the opposed end of the assembly there is provided another first fork (4) that similarly houses a second shaft, or driven shaft, which also has not been shown in the drawings for sake of clarity. The end of said driven shaft is housed in a similar way in an extension (5) of the first fork (4) where there is a housing (6) adapted therefor.

The first forks (1, 4) of both shafts are provided with bores (7, 8) where the ends (9, 10) of the arms of respective crosspieces (11, 12) mutually joining in a hinged way the corresponding first forks (1, 4) with the ends of the second forks (13, 14) of the driving and driven shafts are housed.

Both second forks (13, 14) are mechanically joined to each other by means of an axial displacement device generally denoted by reference numeral (15) in the figures attached in the present specification.

Said axial displacement device (15) has the role of establishing a given play between the clearance of the second forks (13, 14) in order to take up the effects of an external shock which could adversely affect the normal operation of the mechanical system, as to facilitate the assembly of the shafts thanks to said play established therebetween.

Said axial displacement device (15) essentially comprises a first bearing plate (16) formed integrally to the second fork (13) of the driving shaft, an intermediate plate (17) parallel to the first bearing plate (16) and a second bearing plate (18) parallel thereto.

The first bearing plate (16) comprises three guiding and fastening columns (19, 20, 21) formed integrally by their ends (22, 23, 24) in said first bearing plate (16). Said guiding and fastening columns (19, 20, 21) are also formed integrally to the second bearing plate (18) by their opposed ends (25, 26, 27). Fastening of the ends (25, 26, 27) may be by screwing, whilst the guiding and fastening columns (19, 20, 21) may be solid bars or hollow bars to reduce the weight of the assembly.

The intermediate plate (17) of the axial displacement device (15) has through bores (34) allowing the passing of the guiding and fastening columns (19, 20, 21) thereacross. The intermediate plate (17) has a central cylindrical column (28) formed integrally thereto by an end (29) and formed integrally, by the other end (30), to the second fork (14) of the driven shaft. Said central column (28) pass across a central bore (28b) that houses a bush (28a) in the second bearing plate (18) of the axial displacement device (15).

Referring FIG. 2 of the drawings, relative clearance (s) between the first bearing plate (16) and the intermediate plate (17) define the relative displacement between the forks (13, 14) of the respective shafts. By way of an example, the effective play that it has been found for a typical application of a vehicle steering column is about 34 mm. However, this maximum clearance may have any value depending upon the mechanical requirements of the joint as well as the application that is to be intended, possibly up to 100 mm in some cases, or even more.

To isolate the moving mechanical parts from dust, dirt and other external agents, a flexible protective element (31) covering the axial displacement device (15) surrounding it may be provided. By way of an example, a rubber tube (31) surrounding the bearing plates (16, 18) and the intermediate plate (17) may be provided in such a way that is it possible the relative movement thereof in an appropriate way.

Movement of said elements can be controlled through biasing means (32) in the form of a compression spring in order to keep the clearance (s) between the first bearing plate (16) and the intermediate plate (17) from collapse stresses, taking them up in an effective way.

Sliding of the guiding and fastening columns (19, 20, 21) through the intermediate plate (17) is carried out by means of bushes (33) housed into the through bores (34) of said plate (17). If bushes are not provided, the through bores (34) of said intermediate plate (17) must have an inner surface finishing (100) suitable to allow snugly passing of the three columns (19, 20, 21) and to achieve a torque transmission with no play and with a very low sliding stress.

In the preferred embodiment of an improved universal joint according to the present invention shown in the figures, the first bearing plate (16), the intermediate plate (17) and the second bearing plate (18) have a triangular profile with rounded vertexes. In the vicinity of the vertexes of said triangular shape defining the plates (16, 17, 18) said guiding and fastening columns (22, 23, 24) are arranged.

The universal joint as the one herein described allows taking up stresses of an external origin to the system balancing it by displacing the assembly formed by the column (28) with the intermediate plate (17) relative to the guiding and fastening columns (19, 20, 21) and the bearing plates (16, 18). As stated above, this is due to the first bearing plate (16), the fastening columns (19, 20, 21) and the second fork (13) of the driving shaft which are formed integrally to each other, whilst the central column (28) is formed integrally to the intermediate plate (17) and to the other second fork (14). Hence, there is a relative movement between the forks (13, 14) of both shafts that advantageously enables to take up any movement caused by external agents to the driving system.

Once having been sufficiently described what the present patent application consists in accordance to the enclosed drawings, it is understood that any detail modification can be introduced as appropriate, provided that variations may alter the essence of the invention as summarised in the appended claims. In this sense, arrangement of any number of guiding and fastening columns according to the requirements of the joint is falling within the inventive scope of the present invention. On the other hand, the profile of the first bearing plate, the intermediate plate or the second bearing plate will be any profile suitable to the requirements of the assembly.

What is claimed is:

1. An axial displacement universal joint capable of linear expansion and contraction while driving rotational movement between a driving shaft and a driven shaft while said shafts may be facing in different directions, said axial displacement universal joint comprising:
    a driving pivot joint including a first driving fork configured to extend from an end of said-driving shaft, a second driving fork, and a driving central crosspiece, said first driving fork having bores, said second driving fork having bores, and said driving central crosspiece being adapted to be received by said bores of said first and second driving forks, wherein said driving central crosspiece pivotally connects said first driving fork to said second driving fork;
    a driven pivot joint including a first driven fork configured to extend from an end of said driven shaft, a second driven fork, and a driven central crosspiece, said first driven fork having bores, said second driven fork having bores, and said driven central crosspiece being adapted to be received by said bores of said first and second driven forks, wherein said driven central crosspiece pivotally connects said first driven fork to said second driven fork; and
    an axial displacement device configured to mechanically connect said driving pivot joint to said driven pivot joint, said axial displacement device including:
        a first bearing plate having a first and second side, said second driving fork being formed integrally to a central position of said first side;
        a plurality of guiding and fastening columns respectively having a proximal end and a distal end, said proximal ends being formed integrally to said first bearing plate, and said plurality of guiding and fastening columns extend perpendicularly from said first bearing plate in a direction away from said first side;
        an intermediate plate positioned parallel to said first bearing plate with a clearance between said first bearing plate and said intermediate plate being provided by a relative distance between said intermediate plate and said first bearing plate, said intermediate plate having a plurality of through bores and a central column, said plurality of through bores being adapted to respectively receive said plurality of guiding and fastening columns thereacross, and said central column having a proximal end and a distal end, said proximal end of said central column being formed integrally to said intermediate plate, said central column extending from said intermediate plate in a direction away from said first bearing plate, said second driven fork being configured to extend from said distal end of said central column; and
        a second bearing plate positioned parallel to said intermediate plate, including a central bore adapted to receive said central column thereacross, said distal ends of said plurality of guiding and fastening columns are formed integrally to said second bearing plate;
    wherein altering said relative distance by linear displacement of said intermediate plate toward or away from said first bearing plate creates an equidistant displacement of said second driving fork from said second driven fork.

2. The axial displacement universal joint as claimed in claim 1, further comprising a biasing means operable to control said clearance between said first bearing plate and said intermediate plate.

3. The axial displacement universal joint as claimed in claim 1, said plurality of guiding and fastening columns includes three guiding and fastening columns, said three of said plurality of guiding and fastening columns are cylindrical in shape, said proximal ends of said three of said plurality of guiding and fastening columns are formed integrally to said first bearing plate and said distal ends of said three of said plurality of guiding and fastening columns are screwed to said second bearing plate.

4. The axial displacement universal joint as claimed in claim 3, wherein said three of said plurality of cylindrical, guiding and fastening columns are hollow.

5. The axial displacement universal joint as claimed in claim 1, wherein said intermediate plate includes a plurality of bushes respectively housed in said plurality of through bores, said plurality of bushes being adapted to provide controlled passing of said plurality of guiding and fastening columns thereacross, wherein said bushes are configured to eliminate play between said intermediate plate and said plurality of guiding and fastening columns.

6. The axial displacement universal joint as claimed in claim 1, wherein said plurality of through bores of said intermediate plate respectively are adapted to allow snug passing of said guiding and fastening columns therethrough.

7. The axial displacement universal joint as claimed in claim 1, wherein said central column formed integrally to said intermediate plate is formed with a cylindrical member fixed thereto passing through a central bore of said second bearing plate.

8. The axial displacement universal joint as claimed in claim 1, wherein at least one of said first bearing plate, said intermediate plate and said second bearing plate have a quadrilateral profile with rounded vertexes.

9. The axial displacement universal joint as claimed in claim 1, wherein at least one of said first bearing plate, said intermediate plate and said second bearing plate have a triangular profile with rounded vertexes.

10. The axial displacement universal joint as claimed in claim 1, further comprising a flexible protective element being configured to surround said axial displacement device, wherein said flexible protective element is adapted to protect said axial displacement device from an external environment with out impeding axial displacement of said axial displacement device therein.

* * * * *